United States Patent
Goodger

(10) Patent No.: US 6,408,795 B1
(45) Date of Patent: Jun. 25, 2002

(54) DECORATIVE AVIAN ANTI-SPLATTER WALL PANEL

(76) Inventor: John Goodger, 7 Minti Rd., Coram, NY (US) 11727

( * ) Notice: Subject to any disclaimer, the term of this patent is extended or adjusted under 35 U.S.C. 154(b) by 0 days.

(21) Appl. No.: 09/820,161

(22) Filed: Mar. 27, 2001

(51) Int. Cl.$^7$ .............................................. A01K 31/06
(52) U.S. Cl. ....................................................... 119/469
(58) Field of Search ................................. 119/458, 469, 119/420, 471; 248/205.2–205.5; 52/311, 312, 313, 314

(56) References Cited

U.S. PATENT DOCUMENTS

| | | |
|---|---|---|
| 1,186,782 A | 6/1916 | Hercer |
| 1,227,471 A | 5/1917 | Mack |
| D113,165 S | 1/1939 | Hoefler |
| 2,309,830 A | 2/1943 | Dearle ........................ 119/18 |
| 3,654,904 A | 4/1972 | Krueger ...................... 119/18 |
| 3,849,913 A | 11/1974 | Williams ...................... 35/42 |
| 4,067,071 A | 1/1978 | Altman ......................... 4/145 |
| 4,299,064 A | 11/1981 | Daniels ........................ 52/35 |
| 4,432,303 A | 2/1984 | Ellerstorfer ................. 119/17 |
| 4,671,026 A | 6/1987 | Wissinger ..................... 52/35 |
| 4,724,638 A * | 2/1988 | Bezborodko ................ 52/311 |
| 4,974,546 A | 12/1990 | Burgett ....................... 119/18 |
| 4,991,544 A | 2/1991 | Galvin ......................... 119/17 |
| 5,090,357 A | 2/1992 | Pucci ............................. 119/5 |
| 5,269,485 A * | 12/1993 | Dwinell et al. ........... 248/216.4 |
| 5,277,147 A | 1/1994 | Dupuis ......................... 119/18 |
| 5,435,021 A | 7/1995 | Williams ....................... 4/580 |
| 5,749,320 A | 5/1998 | Syndenstricker ........... 119/253 |
| 5,753,310 A | 5/1998 | Bakalar ...................... 427/421 |
| 5,829,071 A | 11/1998 | Lavelle ......................... 4/80 |
| D428,536 S | 7/2000 | Watts ....................... D30/119 |
| 6,315,254 B1 * | 11/2001 | Maloney .................. 248/205.3 |

\* cited by examiner

*Primary Examiner*—Peter M. Poon
*Assistant Examiner*—Chad Copier
(74) *Attorney, Agent, or Firm*—Alfred M. Walker

(57) ABSTRACT

A decorative, washable, protective panel that is adhered to a wall adjacent to bird cage, to prevent bird eating splatter, whereby the washable panel protects a wall adjacent to a bird cage by capturing bird food splatter, wherein further the protective panel does not need to be attached to the cage. Fasteners, such as push pins having peelable release liners exposing adhesive thereunder, attach the back surface of the frame to a wall. The push pins have a pointed shaft, a head, a pressure sensitive adhesive layer and a release liner which is peeled off to expose the adhesive layer prior to attachment to the frame. The panel includes a front layer which is a transparent washable layer such as vinyl, acrylic sheet, polycarbonate sheet or glass. To this is attached a decorative panel layer.

9 Claims, 2 Drawing Sheets

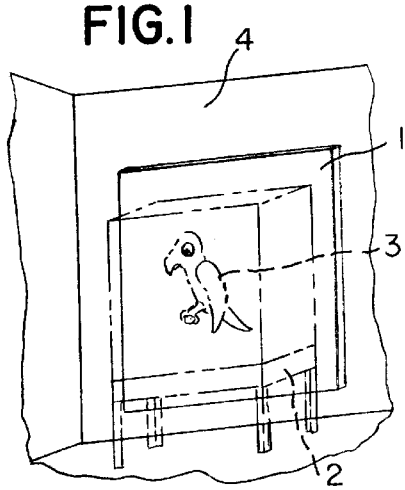
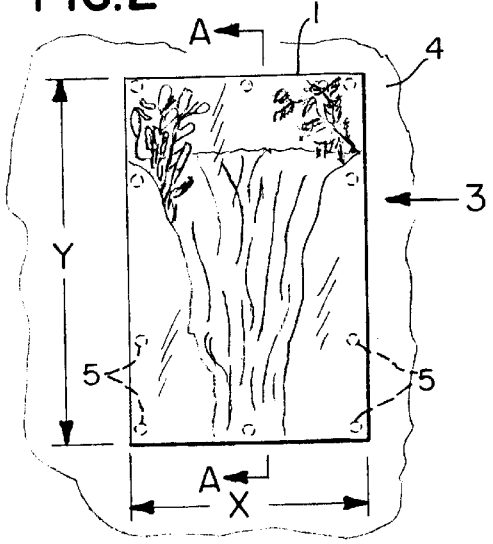
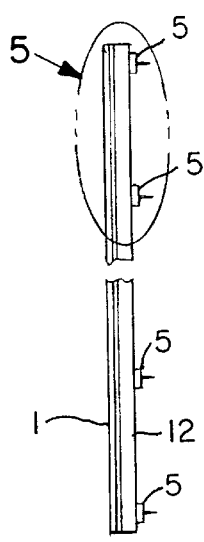
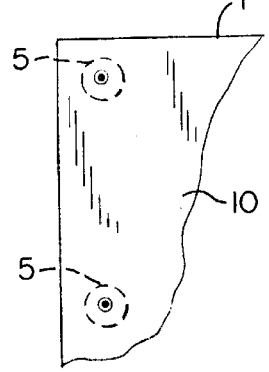
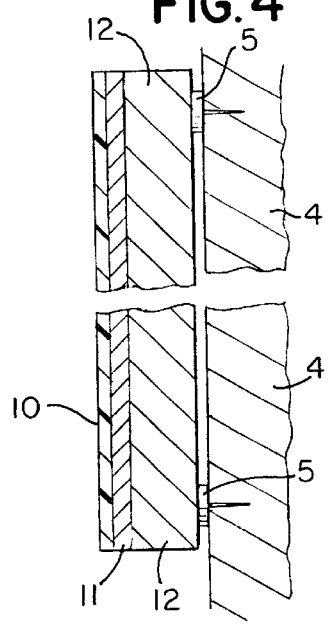
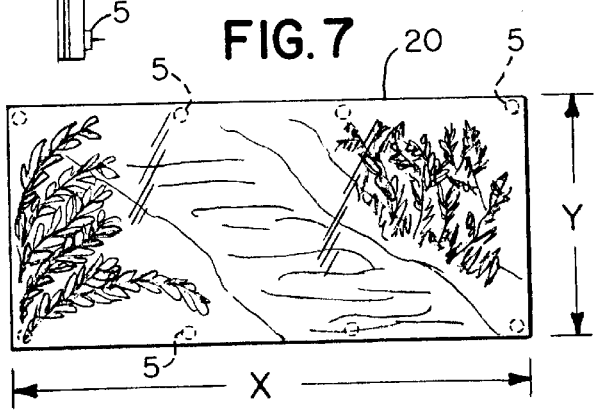
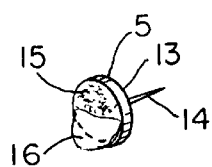

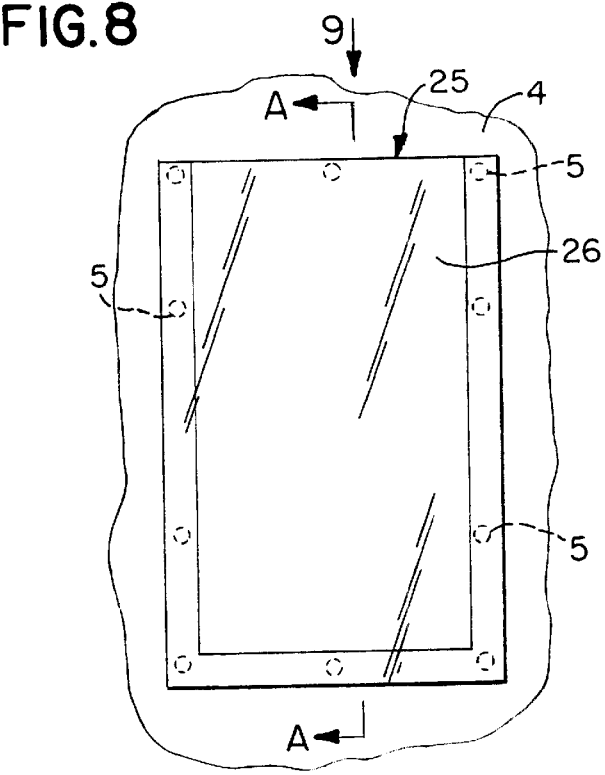
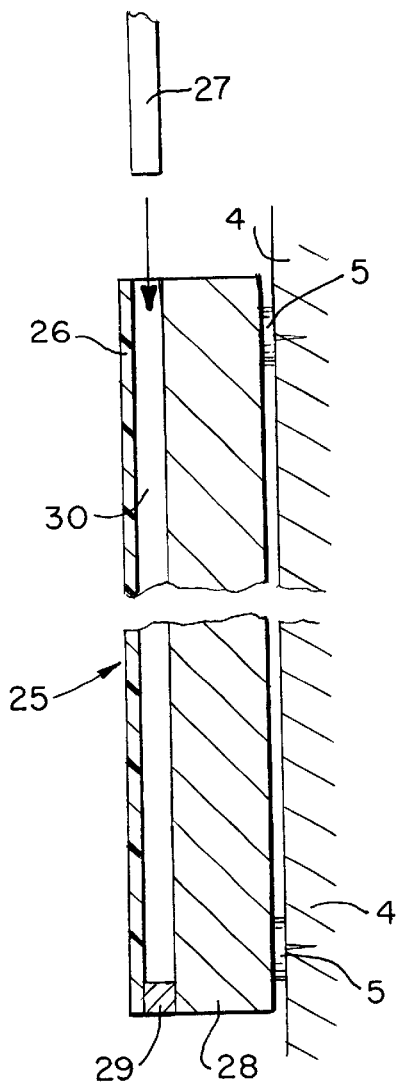
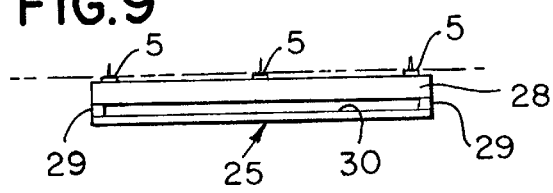
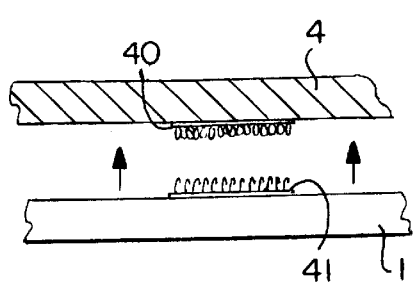

DECORATIVE AVIAN ANTI-SPLATTER WALL PANEL

FIELD OF THE INVENTION

The present invention relates to protective wall coverings in the vicinity of a bird cage.

BACKGROUND OF THE INVENTION

Domestic pet birds are generally sloppy eaters. When eating, they spit food particles through the openings between bird cage structure posts connecting the roof of the bird cage to its floor. Because of the nature of the food and saliva, the resultant splatter leaves marks on adjacent walls that are permanent or hard to remove stains.

Among patents for panels associated with animal housings, U.S. Pat. No. 5,749,320 of Sydenstricker describes a decorative wall covering behind a fish aquarium and U.S. Pat. No. 5,090,357 of Pucci describes a decorative plate attached to a fish aquarium. However, the decorative substrates of Sydenstricker '320 and Pucci '357 are presented as aesthetic backdrops viewed through a fish tank to enhance the simulated marine environment therein.

U.S. Pat. No. 4,991,544 of Galvin, U.S. Pat. No. 1,186,782 of Hercer and U.S. Pat. No. Des428,536 of Watts each describe upstanding walls in bird cages that deflect bird splatter. For example, Hercer '782 discloses slanted screens that extend upward and Watts '536 discloses a bird cage barrier wall for prevention of splattering of water or flying seeds outside of the cage. Galvin '544 discloses a bottom of a bird cage having a transparent extended lip that assists in preventing seeds or water from spraying out of the cage.

With respect to temporary wall coverings in general, U.S. Pat. No. 4,067,071 of Altman, U.S. Pat. No. 5,829,071 of Lavalle, U.S. Pat. No. 5,435,021 of Williams, U.S. Pat. No. 4,671,026 of Wissinger and U.S. Pat. No. 4,299,064 of Daniels each disclose protective panels that are adhered to the wall and/or bathtub ceiling to prevent water damage. However, they are not designed as protective wall coverings to catch splatter from the eating habits of pet birds.

U.S. Pat. No. 4,432,303 of Ellerstorfer, U.S. Pat. No. Des 113,165 of Hoefler and U.S. Pat. No. 1,227,471 of Mack all disclose enclosed bird baths with three sides and a top enclosed to prevent seeds or water from spraying out of the cage.

U.S. Pat. No. 5,277,147 of Dupuis, U.S. Pat. No. 4,974,546 of Burgett, U.S. Pat. No. 3,654,904 of Krueger and U.S. Pat. No. 2,309,830 of Dearle all describe enclosed bird feeders that have overhanging ceiling ledges and side walls to prevent seeds and water from splattering out of a bird cage. But these bird feeders are themselves enclosed by the confines of the bird cage.

None of the foregoing patents disclose a decorative, washable, protective panel that is adhered to a wall adjacent to bird cage, to prevent bird eating splatter, whereby the washable panel protects a wall adjacent to a bird cage by capturing bird food splatter, wherein further the protective panel does not need to be attached to the cage.

OBJECTS OF THE INVENTION

It is therefore an object of the present invention to provide for a decorative anti-splatter washable wall covering, upon a wall in the vicinity of a bird cage.

It is yet another object to provide such a covering, which is removable from the wall, like a poster.

It is also an object to provide such a wall covering which can be cleaned in place upon the wall by wiping, etc.

It is still another object to provide a decorative protective panel that is adhered to a wall adjacent to bird cage, to prevent bird eating splatter.

SUMMARY OF THE INVENTION

In keeping with these objects and others, which may become apparent, the present invention comprises a washable anti-splatter wall covering panel with decorative scene to be placed adjacent to a bird cage to intercept bird eating splatter thereby protecting the wall. This panel is removable from the wall, but may be cleaned in place.

Various attachment methods, such as push pins or hook and loop fasteners, are used to attach the panel to a wall. By "push pin" it is contemplated that the term encompass either a conventional push pin having a pointed shank attached to a cylindrical handle, as well as a conventional thumb tack having also a pointed shank attached to a disc-shaped thumb engagable head portion. In a further embodiment, a separate transparent glazing layer and a channel are provided to accept a variety of decorative scene panels.

BRIEF DESCRIPTION OF THE DRAWINGS

The present invention can best be understood in connection with the accompanying drawings, in which:

FIG. 1 is a perspective view of the anti-splatter panel of the present invention, shown in use with bird cage;

FIG. 2 is a front elevation view of a vertical aspect ratio panel of this invention;

FIG. 3 is a side elevation view of the panel showing attachment to a wall by push pins;

FIG. 4 is a side crossection view (taken along line A—A of FIG. 2);

FIG. 5 is a front corner detail view of the decorative panel of this invention;

FIG. 6 is a perspective view of a push pin with an adhesive layer;

FIG. 7 is a front elevation view of a decorative anti-splatter panel with a horizontal aspect ratio;

FIG. 8 is a front elevation view of an alternate embodiment for an anti-splatter panel;

FIG. 9 is a top plan view of the panel of FIG. 8;

FIG. 10 is a side crossection view showing construction of the alternate embodiment panel (taken at line B—B of FIG. 8); and FIG. 11 is a top plan detail view of an alternate attachment method, using hook and loop fasteners.

DETAILED DESCRIPTION OF THE INVENTION

FIG. 1 shows avian anti-splatter panel 1 attached to wall 4 adjacent to bird cage 2 enclosing bird 3.

FIG. 2 is a front view of a vertical aspect ratio (wherein height Y is greater than width X) panel with a decorative scene.

FIGS. 3, 4 and 5 show construction details of panel 1 and placement of push pins 5 which attach the back surface of frame 12 to wall 4. The front layer 10 is a first outer transparent washable layer such as vinyl, acrylic sheet, polycarbonate sheet or glass. To this is attached a decorative panel layer 11. Push pins 5 shown in FIG. 3 are adhesively attached to the rear base layer frame 12 of panel 1.

FIG. 6 shows the construction of push pins 5 with pointed shaft 14, head 13, pressure sensitive adhesive layer 15 and release liner 16 which is peeled off to expose adhesive layer 15 prior to attachment to frame 12.

FIG. 7 shows a horizontal aspect ratio (wherein width X is greater than height Y) of panel 20.

FIG. 8 shows an alternate embodiment for an anti-splatter wall panel 25, which has a separate self-supporting glazing layer 26. The top plan view of FIG. 9, as well as the side crossection view of FIG. 10, reveal a channel 30 open at the top. This is formed by spacer subframe 29, which attaches rigid transparent layer 26 to main panel frame 28. A variety of decorative panels 27 can be slid into place without removing panel 25 from a wall.

FIG. 11 is a detail view illustrating an alternate attachment method for any of the anti-splatter panels shown, 1, 20 or 25. This includes a mating pair of hook and loop patches (such as VELCRO® brand fasteners) which would be distributed in a similar fashion to push pins 5 around the frame of an anti-splatter panel. The hook material 41 is adhesively attached to the frame of panel 1 by removing a release liner (not shown) exposing a layer of pressure sensitive adhesive. Initially, the matching loop patches 40 are mated with the pre-attached hook patches 41.

Then, the release liners on all the loop patches 40 are removed. At this point, panel 1 (or 20 or 25) is carefully aligned with the desired wall location and then pressed against the wall thereby attaching all the loop patches 40 to the wall.

After the adhesive has set, panel 1 (or 20 or 25) can be removed from the wall by carefully peeling apart the hook patches 41 from the loop patches 40. This is a fully reversible process insuring that panel 1 (or 20 or 25) can be removed and replaced to the same spot on wall 4 many times.

It is further noted that other modifications may be made to the present invention, without departing from the scope of the invention, as noted in the appended claims.

What is claimed is:

1. A combination bird cage and avian splatter containment device protecting a wall located adjacent to said bird cage, said comnbination comprising:

a bird cage having a plurality of spaced-apart structural posts, a roof and a floor, a decorative washable protective panel removably adherable to a wall adjacent to said bird cage, said panel catching bird eating splatter spit out from a bird during eating, said decorative washable panel protecting the wall adjacent to said bird cage by capturing the bird food splatter, said decorative washable protective panel being located adjacent to said bird cage.

2. The combination as in claim 1 wherein said decorative, washable, protective panel is adherable to the wall by a fastener.

3. The combination as in claim 2 wherein said fastener is a hook and loop fastener.

4. The combination as in claim 2 wherein said fastener is a separate transparent glazing layer above said panel, said panel insertable within a channel of a spacer subframe attached to a base.

5. The combination as in claim 2 wherein said fastener is a push pin.

6. The combination as in claim 5 wherein said push pin includes a pressure sensitive adhesive covered by a removable release liner peelable off to expose said adhesive layer, said adhesive layer attaching said push pin to a rear surface of said decorative washable, protective panel.

7. The combination as in claim 5 wherein said fastener is a thumb tack.

8. The combination as in claim 7 wherein said thumb tack includes a pressure sensitive adhesive covered by a removable release liner peelable off to expose said adhesive layer, said adhesive layer attaching said push pin to a rear surface of said decorative washable, protective panel.

9. The combination as on claim 1 wherein said decorative, washable protective panel includes a first outer transparent washable layer and a decorative panel layer, said decorative panel layer attached to a rear frame base layer.

* * * * *